April 2, 1957
J. J. TOPOLINSKI
2,787,195
DEBURRING TOOL
Filed July 17, 1953
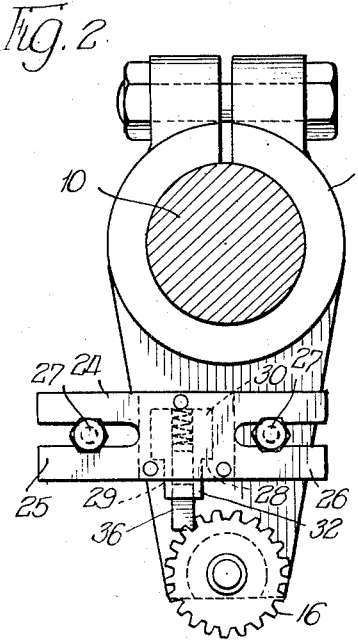
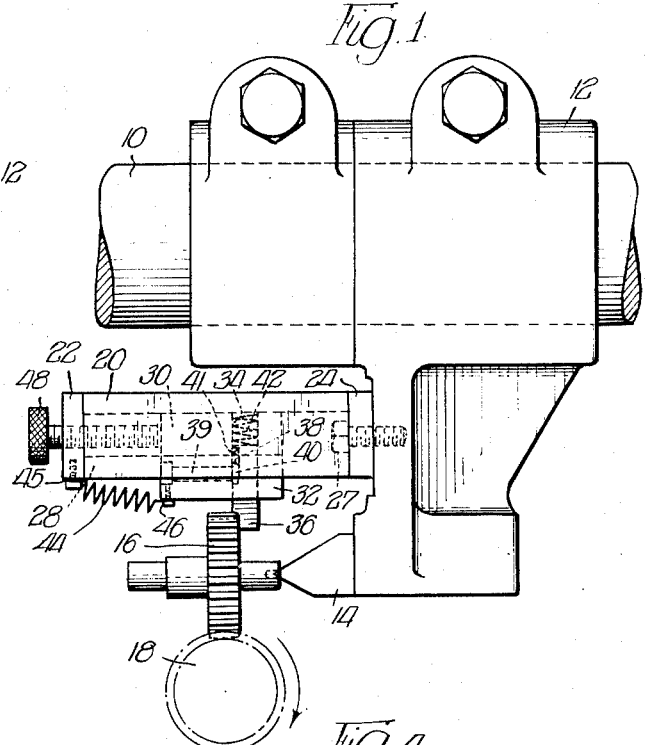
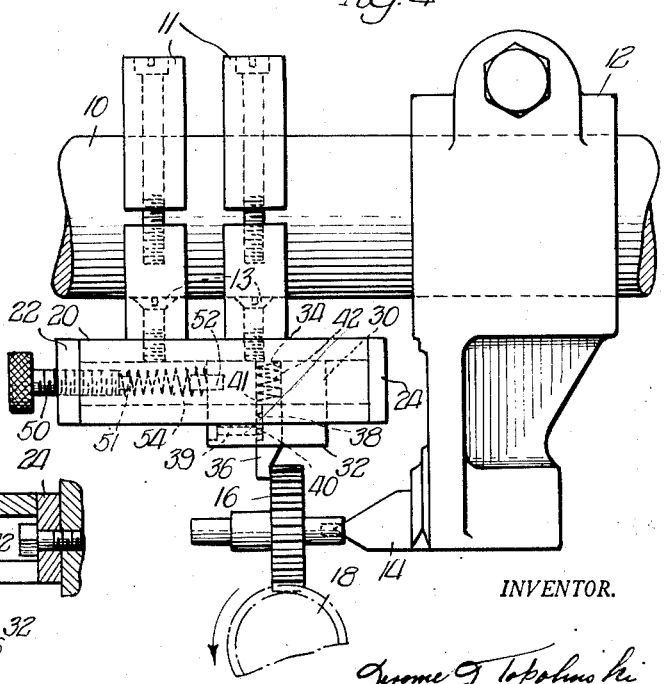
INVENTOR.
Jerome J. Topolinski ated Apr. 2, 1957

2,787,195

DEBURRING TOOL

Jerome J. Topolinski, Lincolnwood, Ill., assignor to Skil Corporation, Chicago, Ill., a corporation of Delaware Application July 17, 1953, Serial No. 368,698

3 Claims. (Cl. 90—1.4)

The present invention relates to certain improvements in a deburring tool.

In hobbing gears and the like, a burr is usually formed on the outer periphery of a work piece in the direction of rotation of the hob. When the hobbing operation has been completed, the gear is then transferred to a deburring department where rotating steel brushes are used to remove these burrs. Attempts have been made to remove these burrs by placing the gears in a lathe but the burrs, instead of being cut off and removed, are merely bent inwardly between the teeth and the steel brushing operation to completely remove the burr must follow. These additional steps are costly and wasteful of man-power.

One object of the present invention is to provide a tool that will remove burrs on a work piece during the main cutting operation.

Another object is to provide a tool that will remove burrs on a work piece without substantially cutting the work piece.

A further object is to provide a tool that is self adjusting to the periphery of a work piece so that it may deburr without substantially cutting into the work piece.

Other objects will appear hereafter and become apparent to those skilled in the art from an understanding of the following description and a review of the accompanying drawings wherein mechanism embodying certain forms of the invention is set forth and explained for purposes of exemplification.

In the drawings:

Fig. 1 is a view in side elevation of a tool embodying the invention.

Fig. 2 is a view in end elevation showing the tool of Fig. 1.

Fig. 3 is a sectional view through the tool of Fig. 1, and

Fig. 4 is a view in side elevation of another embodiment of the invention.

The exemplification of the present invention is in connection with a metal cutting hobbing machine. As shown it may be mounted in any convenient manner adjacent a work piece such as on the center support bracket of Fig. 1 or on a separate bracket as in Fig. 4. Its attachment depends primarily on which side of the work piece that a burr is formed by the cutting action of the hob.

To prevent the work piece from being cut or gouged by the deburring tool, the latter is preferably mounted for a yielding action both axially of the work piece and radially or substantially tangential thereto depending on its positioning with relation to the work piece. By this yielding mounting, the tool may follow the contours of the piece, removing the burr while not substantially cutting the blank.

For better control, the tool may be made manually adjustable in its yielding mounting so that an operator may easily increase or decrease the tension to arrive at optimum results.

With reference to Fig. 1 of the drawings it may be seen that there is shown an arm 10 of a hobbing machine (not shown) with a center support bracket 12 slidingly mounted thereover in the customary manner, and carrying the usual center 14 by which a work piece 16 is held in the hobbing machine to be cut by a hob 18 that normally turns in the direction of the arrow. In Fig. 1 the cutting edge of the hob enters the work piece from the left hand side as viewed and leaves from the right hand side, leaving a burr on the work piece on the right hand peripheral edge where it leaves the work piece.

To remove this burr, the embodiment of the invention in Fig. 1 comprises a deburring tool in the nature of an attachment, including a housing 20 enclosed at one end with a cap member 22 and at the other end by an attaching cap member 24 that may have slotted extensions 25 and 26 for conveniently mounting the attachment to the center support bracket 12 by any suitable means such as the bolts 27.

The interior of the housing 20 is rectangular in cross section as may be seen in Fig. 2 in dotted lines and is slotted through its bottom wall 28 by a slot 29 that is of less width than the interior width of the housing to receive and form a guide for a T-shaped tool carrier member 30 riding in the T-shaped housing thus provided. This tool carrier member has a sliding fit within the housing and a depending leg portion 32 of less area that extends downwardly through the slotted portion 29 of the housing adjacent the work piece 16. Tests indicate that this sliding fit should permit free lengthwise movement of the carrier within the housing without any substantial rocking motion. A guideway 34 is provided vertically through the tool carrier and its depending portion 32 to receive a deburring tool 36 of suitable shape.

In order to keep this deburring tool from turning on its axis, the guideway 34 may be formed rectangular in cross section to receive the tool in a sliding but substantially non-turning or non-rocking fit. Or the tool may be provided with a ground holding slot 38, while an opening perpendicular thereto may be provided in the carrier member 30 and a cross screw 39 inserted therein having a dog point 40 extending into and riding in slot 38 to prevent rotation of the tool 36. For convenience the slot 38 should not be ground through the inner end of tool 36 so that a stop portion 41 is provided to prevent the tool from dropping out of its carrier member when the tool is not in contact with a work piece. The contact of the stop portion 41 with the dog point 40 prevents this action. Cross screw 39 may be of the "Allen head" type so that it may fit flush with the carrier member 30.

The tool member 36 is yieldingly held in vertical contact with a work piece by a spring member 42 that is mounted in guideway 34 against the topwall of housing 20 and the inner end of tool 36 to yieldingly press tool 36 outwardly into contact with a work piece. For yielding movement of the tool 36, axial to the workpiece a further spring member 44 may be mounted externally of the attachment with one end attached to the housing 20 as at 45 and the other end to the carrier member leg 32 as at 46 to yieldingly pull the carrier member and its tool in an axial direction against the work piece.

The housing cap member 22 may be provided with an interiorly threaded opening to receive an exteriorly threaded stop bolt 48 that will positively limit the axial travel of the carrier member 30 and its tool against the work piece 16 to substantially prevent unwanted cutting or gouging by the deburring tool.

The profile of the tool member 36 depends on the profile of the work piece and is within the skill of the operator to provide.

In operation the work piece is properly held in the hobbing machine and the center support bracket 12 is slid over the arm to bring the center 14 to its proper position against the work piece. This brings the attachment 20 adjacent to the work piece so that the tool member 36 may be properly positioned on the periphery of the work piece or gear blank. The bracket is clamped in place and the machine started so that hob 18 commences its cutting operation on the rotating gear blank or other work piece. The tool 36 yieldingly removes the burrs as they are formed by the hob 18. Without knowing the exact action, it may be that the tool 36 bends the burr back between the teeth and the hob again clears the teeth while cutting deeper. Whether it is a combined action of hob and deburring tool is not accurately known, but, a clean finished piece results. From observation this deburring operation appears to constitute a shaving action.

When the piece is finished, the machine is stopped and the center support bracket with the attachment 20 is backed off to remove the finished piece to be replaced by a new blank.

In Fig. 4 is shown a modification of the invention wherein the housing is not attached to the center support bracket 12 but is provided with a separate support bracket 11 by which the housing 20 is positioned adjacent the work piece 16 by any suitable means such as the bolts 13. It will be noted that the deburring tool member 36 is mounted on the other side of the work piece and that the hob is rotating in a counterclockwise direction.

Instead of the external spring 44 and the stop bolt 48 of Fig. 1, a modified yielding means is disclosed. The bolt 50 is provided in place of the stop bolt 48 and has a reduced spring rest portion 51 formed on its inner end. A further spring rest stud 52 is mounted in the carrier member 30 and between them is mounted a spring member 54 that yieldingly presses the carrier member and its tool 36 toward the work piece 16. By turning the bolt 50, pressure on spring 54 may be modified for proper shaving action on the burr without danger of substantially cutting into the work piece.

I claim:

1. An attachment for a machine tool such as a gear hobbing machine that normally forms a burr on the workpiece extending from a surface of the workpiece, said attachment comprising a guide adapted to be mounted adjacent said surface normal to a plane containing said surface, a tool carrier mounted in said guide biased toward said surface, and a tool presenting a cutting edge toward said surface resiliently mounted in said tool carrier for motion in a direction normal to the length of said guide.

2. A deburring means for association with a machine tool such as a gear hobbing machine that forms burrs on a surface of a workpiece in the machine, said means comprising a deburring tool having a cutting edge resiliently pressed against said surface of the workpiece on which said burrs are formed in a direction normal to said surface, and said deburring tool being resiliently mounted for limited movement parallel to its cutting edge in the plane of said surface.

3. The deburring means of claim 1 for use with a machine tool having a cylindrical arm supporting a center for mounting the workpiece, said guide being provided with clamping means adapted to engage and grip said arm whereby said deburring means may be mounted in selected adjusted position with respect to said workpiece along said arm.

References Cited in the file of this patent
UNITED STATES PATENTS

| | | |
|---|---|---|
| 1,505,420 | Petersen | Aug. 19, 1924 |
| 1,897,374 | Goebel | Feb. 14, 1933 |
| 1,928,770 | Uhlmann et al. | Oct. 3, 1933 |
| 2,184,232 | Christman | Dec. 19, 1939 |
| 2,206,449 | Christman | July 2, 1940 |
| 2,206,450 | Christman | July 2, 1940 |